US008327543B2

(12) United States Patent
Lafon

(10) Patent No.: US 8,327,543 B2
(45) Date of Patent: Dec. 11, 2012

(54) WING MOUNTING

(75) Inventor: Paul Lafon, Castelnau d'Estretefonds (FR)

(73) Assignee: Airbus Operations SAS, Hamburg (DE)

( * ) Notice: Subject to any disclaimer, the term of this patent is extended or adjusted under 35 U.S.C. 154(b) by 322 days.

(21) Appl. No.: 12/789,305

(22) Filed: May 27, 2010

(65) Prior Publication Data

US 2010/0257719 A1    Oct. 14, 2010

Related U.S. Application Data

(63) Continuation of application No. PCT/EP2007/063013, filed on Nov. 29, 2007.

(51) Int. Cl.
*B21D 39/00* (2006.01)
*B21D 53/92* (2006.01)
(52) U.S. Cl. .......... 29/897.2; 29/407.01; 29/407.05; 29/407.09; 29/407.1
(58) Field of Classification Search ........... 29/897.2, 29/407.01, 407.05, 407.09, 407.1, 709, 712, 29/714
See application file for complete search history.

(56) References Cited

U.S. PATENT DOCUMENTS

| 5,168,453 | A  | * | 12/1992 | Nomaru et al. ........... 700/114 |
| 6,230,382 | B1 | * | 5/2001  | Cunningham et al. ....... 29/407.1 |
| 6,701,064 | B1 |   | 3/2004  | De Haan et al. |
| 7,145,647 | B2 |   | 12/2006 | Suphellen et al. |
| 2005/0172470 | A1 | | 8/2005 | Cobb et al. |

FOREIGN PATENT DOCUMENTS

| EP | 0957336  | A  | 11/1999 |
| EP | 1447644  | A1 | 8/2004  |
| EP | 1447677  | A  | 8/2004  |
| RU | 2097284  | C1 | 11/1997 |
| RU | 2165836  | C2 | 4/2001  |
| RU | 2233011  | C2 | 7/2004  |
| WO | 01/76943 | A  | 10/2001 |

OTHER PUBLICATIONS

Chinese Office Action for CN Application No. 2006100834723 mailed Feb. 22, 2008.
Russian Patent Office, Russian Office Action dated Apr. 20, 2012 for Russian Patent Application No. 2010126142/11.
International Search Report for PCT/EP2007/063013 mailed Mar. 26, 2009.
Russian Patent Office, Russian Notice of Allowance dated Jun. 5, 2012 for Russian Patent Application No. 2010126142.
Editor-In-Chief Ishlinskiy, "New Polytechnic Dictionary—Big Russian Encyclopedia," 2003, p. 309, Moscow.
Dorot V.L. et al., "Glossary of modern computer lexicon", 2004, p. 394, 3rd edition, Saint-Petersburg.
Grigoryev V.P., Ganikhanov S.F., "Device for assembly of knots and units of aircraft and helicopters", 1977, pp. 68-70, Mashinostronie, Moscow.

* cited by examiner

*Primary Examiner* — Jermie Cozart
(74) *Attorney, Agent, or Firm* — Ingrassia Fisher & Lorenz P.C.

(57) ABSTRACT

A method is provided for mounting a wing of an aircraft to a fuselage of the aircraft, in which a difference between a vertical target position and a vertical actual position of a mounting point is determined. Then, on the basis of the determined difference, a readjustment of the wing is performed.

8 Claims, 6 Drawing Sheets

WING MOUNTING

CROSS-REFERENCE TO RELATED APPLICATIONS

This is a continuation of International Application No. PCT/EP2007/063013, filed Nov. 29, 2007, which is hereby incorporated by reference in its entirety.

TECHNICAL FIELD

The technical field relates to airplane assembly. In particular, the technical field relates to a method for mounting a wing of an aircraft to a fuselage of the aircraft, a mounting system, a computer-readable medium, a program element and a processor.

BACKGROUND

When, during aircraft assembly, a wing of the aircraft has to be mounted to the fuselage of the aircraft care has to be taken that both the angle of attack and the sweep are correct. Therefore, the wing is mounted to a moveable positioning unit which is adapted for moving the wing to the fuselage and for adjusting the position of the wing with respect to the fuselage. However, this adjustment procedure is a laborious and time consuming process.

It is therefore at least one object of the invention to provide for an improved wing adjustment. In addition, other objects, desirable features, and characteristics will become apparent from the subsequent summary and detailed description, and the appended claims, taken in conjunction with the accompanying drawings and this background.

SUMMARY

According to an exemplary embodiment of the present invention, a method is provided for mounting a wing of an aircraft to a fuselage of the aircraft, the method comprising the step of determining a difference between a first actual z-position of a first mounting point of the wing and a first target z-position of the first mounting point, wherein the determination of the first difference is performed on the basis of a first measurement device attached to the fuselage and a first positioning device attached to the wing.

Therefore, according to this exemplary embodiment of the present invention, by simply attaching a measurement device to the fuselage and a positioning device to the wing, a mis-adjustment of the wing can be determined during the mounting procedure. This may provide for a fast and effective wing adjustment.

According to another exemplary embodiment of the present invention, the method further comprises the step of determining a second difference between a second actual z-position of a second mounting point of the wing and a second target z-position of the second mounting point, wherein the determination of the second difference is performed on the basis of a second measurement device attached to the fuselage and a second positioning device attached to the wing.

Therefore, according to this exemplary embodiment of the present invention, a second measurement of a mis-adjustment of the wing is performed, for example, at a different location of a contact area between wing and fuselage. Thus, a two-dimensional wing adjustment may be possible.

According to another exemplary embodiment of the present invention, the method further comprises the step of adjusting the wing with respect to the fuselage on the basis of at least one of the first difference and the second difference.

For example, according to this exemplary embodiment of the present invention, after having determined the two differences, a wing adjustment may be performed, resulting in a reduction or minimisation of the differences.

According to another exemplary embodiment of the present invention, the method further comprises the steps of attaching the first measuring device to the fuselage, arranging the first positioning device at a defined position relative to the first measuring device, transferring a hole located at the first mounting point to the first positioning device, resulting in a hole in the first positioning device, and attaching the first positioning device to the wing, such that the position of the hole corresponds to a position of a wing mounting point.

Thus, for example, the exact position of the first mounting point with respect to the measuring device may be transferred to the positioning device, which is then attached to the wing. Therefore, after moving the wing to the fuselage, it may be determined, whether the measuring device and the positioning device are now in the defined position relative to each other or not. If they are not in the defined position relative to each other, a corresponding difference is determined on which basis a further adjustment may be performed.

According to another exemplary embodiment of the present invention, arranging of the first positioning device at the defined position relative to the first measuring device is performed by means of a spacer.

For example, the spacer may be adapted as a lock consisting of, for example, aluminium, titanium or any other metal or metal compound, or any other material, such as a synthetic material. However, the spacer may be of any other form.

According to another exemplary embodiment of the present invention, the method further comprises the step of adjusting the wing on the basis of a crown fitting.

Such a crown fitting may provide for a correct wing adjustment along the y-axis as shown in FIG. 1.

According to another exemplary embodiment of the present invention, the method further comprises the step of adjusting the wing on the basis of a determination of a contact between a spar and the wing.

This may provide for an exact wing adjustment with respect to the x-axis as shown in FIG. 1.

According to another exemplary embodiment of the present invention, the determination of the first difference is performed by means of an electronic determination device.

Furthermore, the determination of the second difference may be performed by means of the same or a different electronic determination device. This may provide for a fast and exact difference determination.

According to another exemplary embodiment of the present invention, a mounting system for mounting a wing of an aircraft to a fuselage of the aircraft is provided, the mounting system comprising a determination unit for determining a first difference between a first actual z-position of a first mounting point of the wing and a first target z-position of the first mounting point, wherein the determination of the first difference is performed on the basis of a first measurement device attached to the fuselage and a first positioning device attached to the wing.

According to another exemplary embodiment of the present invention, a computer-readable medium may be provided, in which a computer program of mounting a wing of an aircraft to a fuselage of the aircraft is stored which, when being executed by a processor, causes the processor to carry out the above-mentioned method steps.

Furthermore, according to another exemplary embodiment of the present invention, a program element of mounting a wing of an aircraft to a fuselage of the aircraft is provided which, when being executed by a processor, causes the processor to carry out the above-mentioned method steps.

Furthermore, according to another exemplary embodiment of the present invention, a processor for mounting a wing of an aircraft to a fuselage of the aircraft may be provided, the processor being adapted to carry out the above-mentioned method steps.

The mounting and adjustment process may be embodied as the computer program, i.e., by software, or may be embodied using one or more special electronic optimisation circuits, i.e. in hardware, or the method may be embodied in hybrid form, i.e., by means of software components and hardware components.

The program element, according to an exemplary embodiment of the invention, is preferably loaded into working memories of a data processor. The data processor may thus be equipped to carry out exemplary embodiments of the methods of the present invention. The computer program may be written in any suitable programming language, such as, for example, C++ and may be stored on a computer-readable medium, such as a CD-ROM. Also, the computer program may be available from a network, such as the World Wide Web, from which it may be downloaded into processors or any suitable computers.

These and other aspects of the present invention will become apparent from and elucidated with reference to the embodiments described hereinafter.

BRIEF DESCRIPTION OF THE DRAWINGS

The invention will now be described, by way of example only, with reference to the accompanying drawings, in which.

The illustrations in the drawings are schematic. In different drawings, similar or identical elements are provided with the same reference numerals.

DETAILED DESCRIPTION

The following detailed description of the invention is merely exemplary in nature and is not intended to limit application and uses. Furthermore, there is no intention to be bound by any theory presented in the preceding background or summary or the following detailed description.

Figure 1:
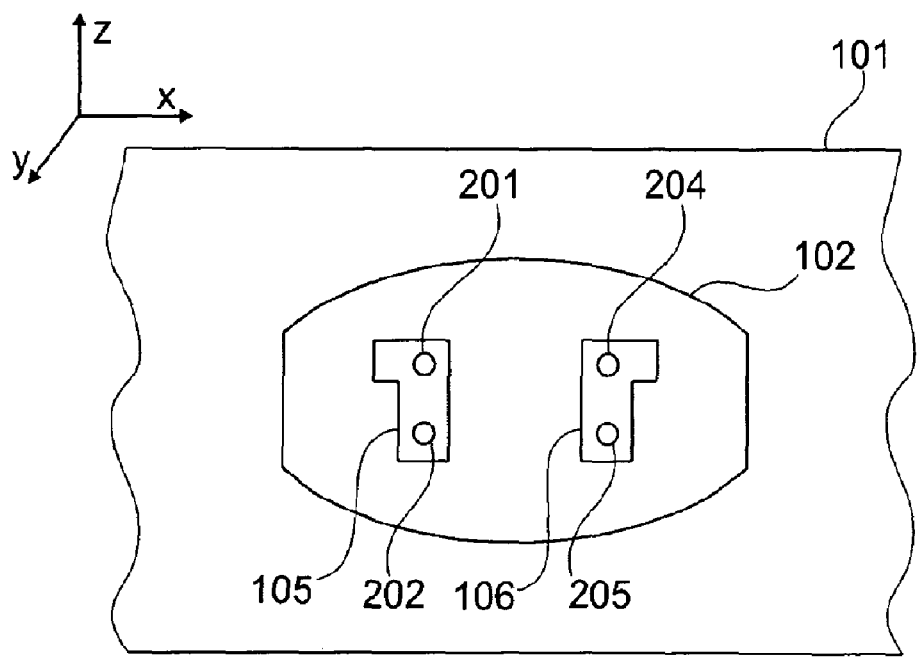
FIG. 1 shows a schematic representation of a section of a fuselage of an airplane to which the wing is mounted.

FIG. 1 shows a schematic representation of an airplane fuselage 101 with a mounting section 102 at which a wing can be mounted. The mounting section 102 comprises mounting holes 201, 202, 204, 205. The mounting holes 201, 202, 204, 205 are adapted for positioning the wing with the respect to the fuselage 101.

The mounting section 102 may further comprise a front spar and a back spar (not depicted in FIG. 1). The wing which has to be mounted to the mounting section 102 may comprise a corresponding front spar and a corresponding back spar.

Front spar and back spar each comprise two bore holes 201, 202 and 204, 205. Furthermore, first and second positioning devices 105, 106 may be attached to the mounting section 102 (and arranged at a defined position with respect to the four bore holes).

The coordinate system at the upper left of FIG. 1 defines the directions of the x, y and z-axes.

Figure 2:
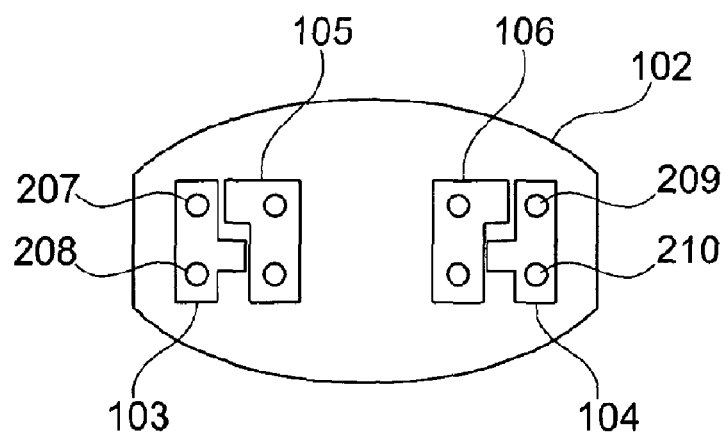
FIG. 2 shows a schematic representation of the mounting section according to an exemplary embodiment of the present invention.

FIG. 2 shows a schematic representation of the mounting section 102 after installation of the mounting devices 103, 104 and the positioning devices 105, 106.

At a first step, the first measuring device 103 is attached to the fuselage or mounting section 102 by means of, for example, attachment devices 207, 208. Furthermore, at the other side of the mounting section 102, the measuring device 104 is attached to the mounting section 102 by means of attachment devices 209, 210.

Figure 5:
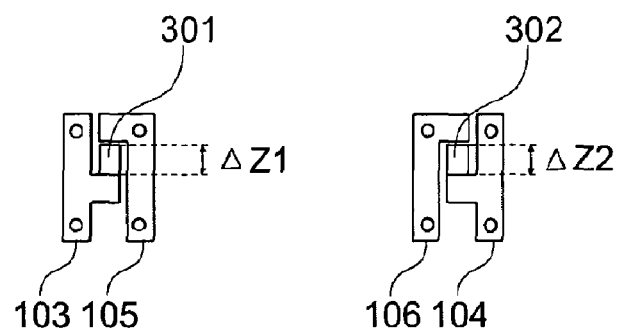
FIG. 5 shows a schematic representation of positioning devices arranged at a defined location with respect to mounting devices with the help of spacer units, according to an exemplary embodiment of the present invention.

Then, in a second step, the first positioning device 105 is arranged at a defined position relative to the first measuring device 103. Such arrangement may be performed with the help of a spacer 301 (as depicted in FIG. 5). Furthermore, the second positioning device 106 is arranged at a defined position relative to the second measuring device 104.

Then, the positioning holes 201, 202 are transferred into the first positioning device 105, resulting in a hole in the first positioning device 105. Furthermore, holes 204, 205 are transferred to the second positioning device 106.

Then, in a next step, the first and second positioning devices 105, 106 are attached to the wing.

Then, the wing is moved towards the fuselage and the differences between the actual z-positions of the first and second mounting points 211, 213 of the wing 107 (see FIG. 4) means first and second target z-positions 201, 204, respectively, are determined.

After that, a wing adjustment may be performed on the basis of the determined differences.

Figure 3:
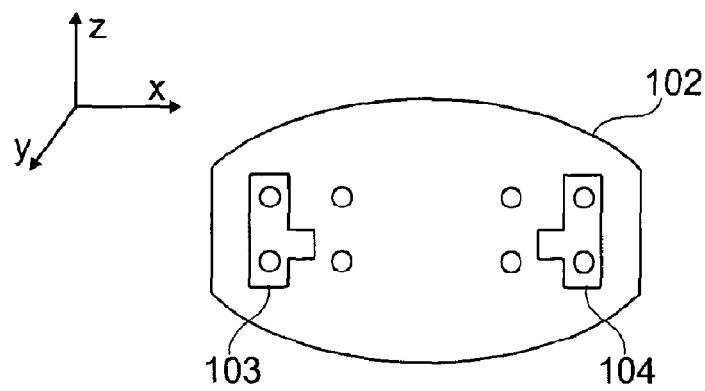
FIG. 3 shows a schematic representation of the mounting section after having transferred the holes to the positioning devices.

FIG. 3 shows a schematic representation of the mounting section 102 at which the first measuring device 103 and the second measuring device 104 are attached.

Figure 4:
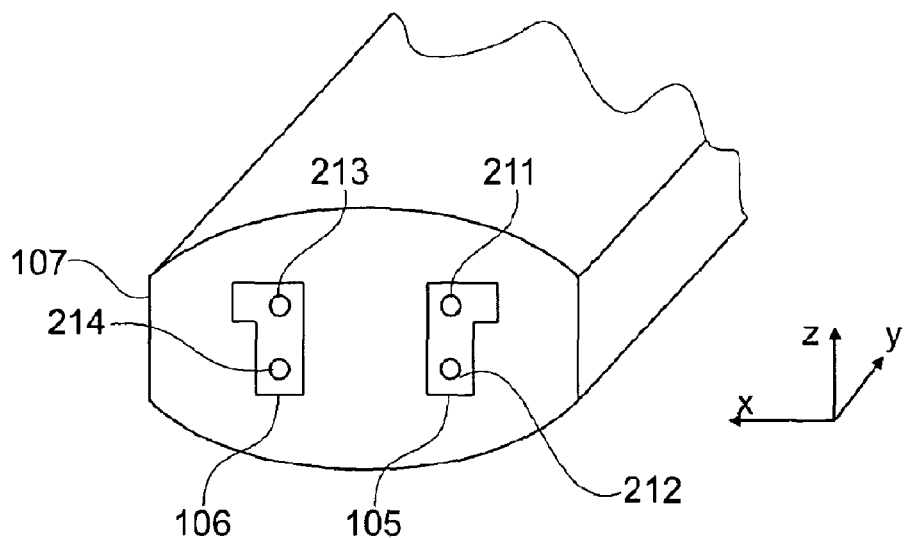
FIG. 4 shows a schematic representation of a wing at which the positioning devices are attached.

FIG. 4 shows a schematic representation of the wing 107, at which the first positioning device 105 and the second positioning device 106 are attached at the mounting points 211, 212 and 213, 214, respectively.

The mounting points 211, 212 and 213, 214 thereby correspond to the target positions 201, 202 and 204, 205 which are located at the mounting section 102 of the fuselage 101.

FIG. 5 shows a schematic representation of the measuring devices 103, 104 and the positioning devices 105, 106, which are arranged with respect to the measuring devices 103, 104 with the help of respective spacer units 301, 302.

The spacer units 301, 302 may, for example, have a thickness $\Delta z1$, $\Delta z2$ of, for example, 20 mm. However, the thickness may be bigger or smaller.

After having attached the measuring devices 103, 104 to the mounting section 102 of the fuselage 101 and after having attached the positioning devices 105, 106 to the wing 107, and after having moved the wing towards the fuselage, $\Delta z1$ and $\Delta z2$ may be measured. In case $\Delta z1$ and $\Delta z2$ differ from the target value (which is, for example, 20 mm), a further wing adjustment may be performed.

The measuring devices or the positioning devices may comprise grooves or trenches, such that an attachment position can be varied. Therefore, the spacer 301 may always fit in between.

Figure 6:
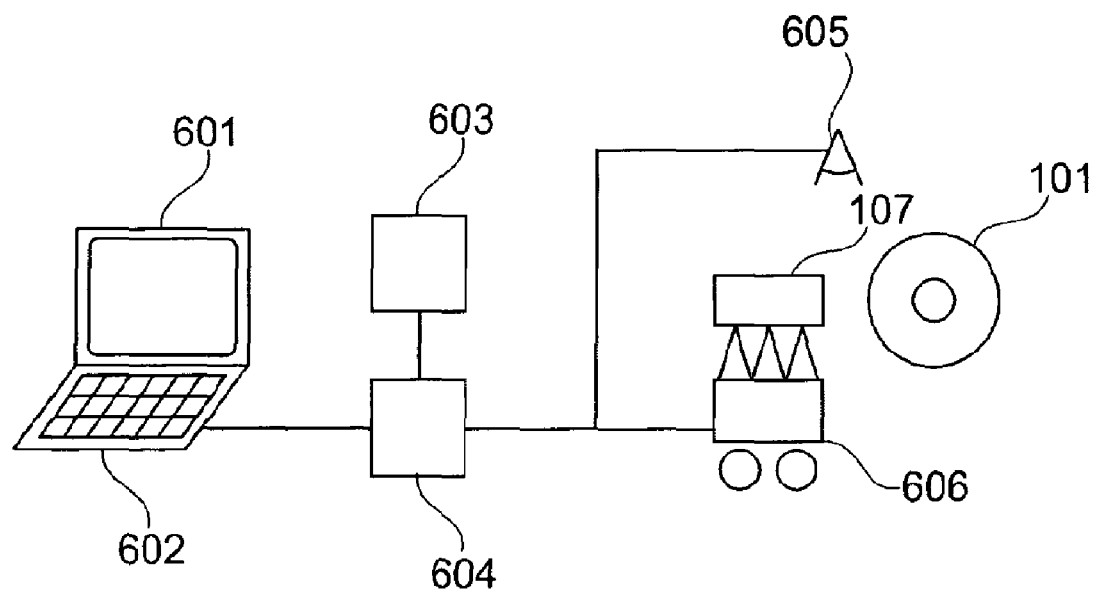
FIG. 6 shows a mounting system for performing the method according to an exemplary embodiment of the present invention.

FIG. 6 shows a mounting system for mounting a wing of an aircraft to a fuselage of the aircraft, according to an exemplary embodiment of the present invention. The mounting system depicted in FIG. 6 comprises an output unit 601, for example a computer screen, and an input unit 602, for example a keyboard. Furthermore, the system comprises a processor 604 and a storage unit 603 in which a computer program for mounting the wing to the fuselage is stored.

Furthermore, the mounting system comprises a determination unit 605 adapted for determining the differences $\Delta z1$ and $\Delta z2$. The determination unit 605 may further be adapted for determining, for example a contact between a spar and the wing or for determining a crown fitting.

Further determination units may be provided.

The mounting system further comprises a wing mounting unit 606, which is adapted for moving and positioning the wing 107 with respect to the fuselage 101.

The wing mounting and positioning may be performed in a fully automated manner or user guided in a semi-automated manner.

Figure 7:
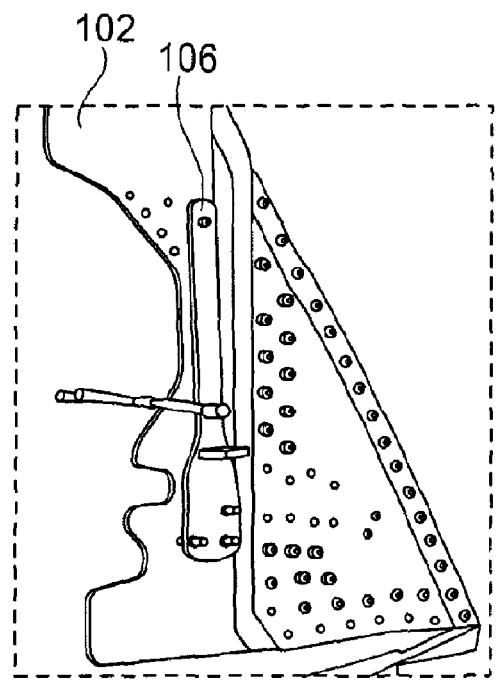
FIG. 7 shows a representation of the mounting section of FIG. 1 in a first assembly state according to an exemplary embodiment of the present invention.

FIG. 7 shows a representation of the mounting section of FIG. 1 in a first assembly state according to an exemplary embodiment of the present invention. As may be seen from the figure, a positioning device 106 is attached to the mounting section 102 of the fuselage.

Figure 8:
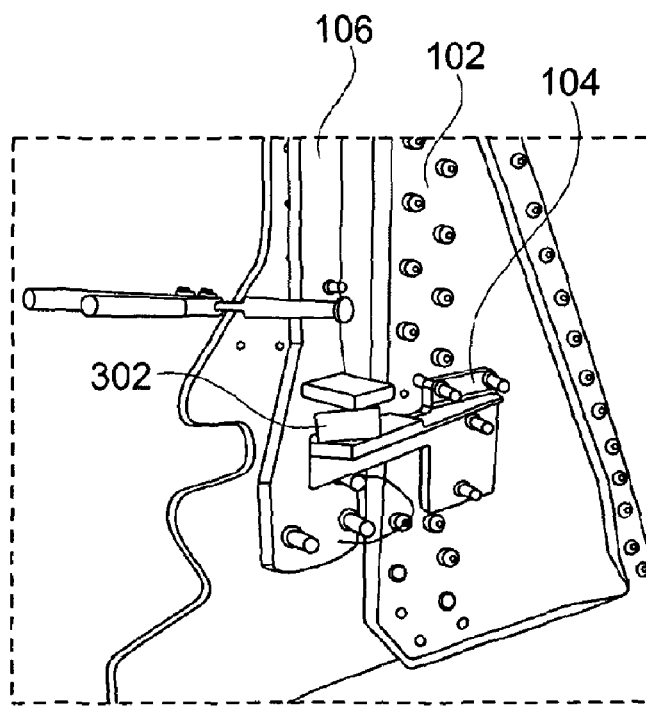
FIG. 8 shows a representation of the mounting section of FIG. 1 in a second assembly state according to an exemplary embodiment of the present invention.

FIG. 8 shows a representation of the mounting section of FIG. 1 in a second assembly state according to an exemplary embodiment of the present invention. Here, a measurement device 104 is attached to the mounting section 102 of fuselage at a predetermined distance from the measurement device 104 (e.g. by transferring holes from the fuselage to the measurement device 104). The distance is determined by spacer 302.

Figure 9:
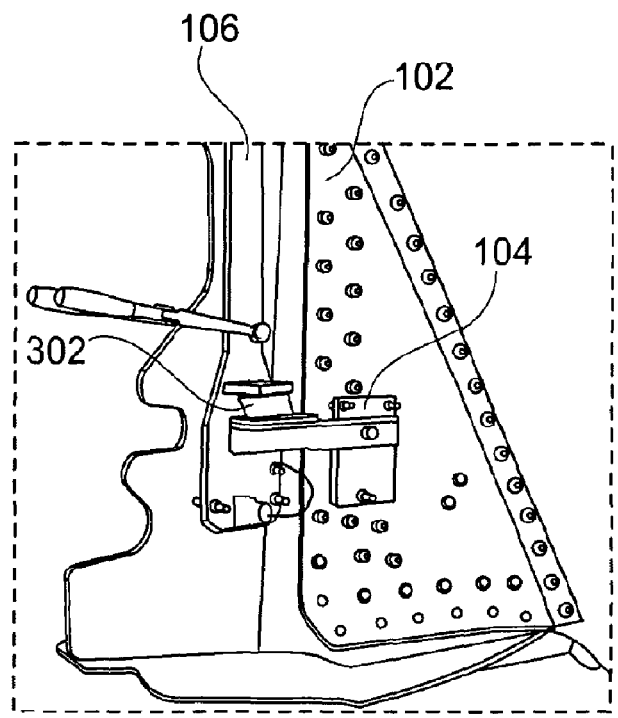
FIG. 9 shows a representation of the mounting section of FIG. 1 in a third assembly state according to an exemplary embodiment of the present invention.

FIG. 9 shows a representation of the mounting section of FIG. 1 in a third assembly state, in which all three elements 102, 104 and 104 are assembled at the mounting section.

Figure 10:
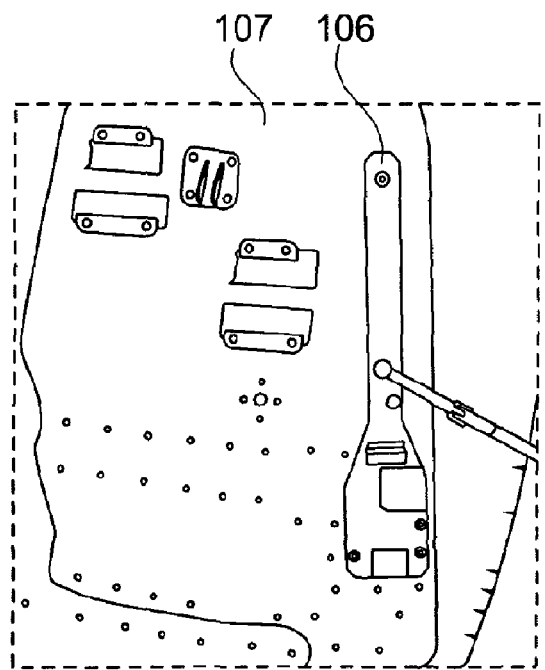
FIG. 10 shows a representation of the wing of FIG. 4 in a fourth assembly state according to an exemplary embodiment of the present invention.

FIG. 10 shows a representation of the wing of FIG. 4 in a fourth assembly state according to an exemplary embodiment of the present invention. Here, the positioning device 106 is attached to the wing 107, for example by using the transferred holes.

Figure 11:
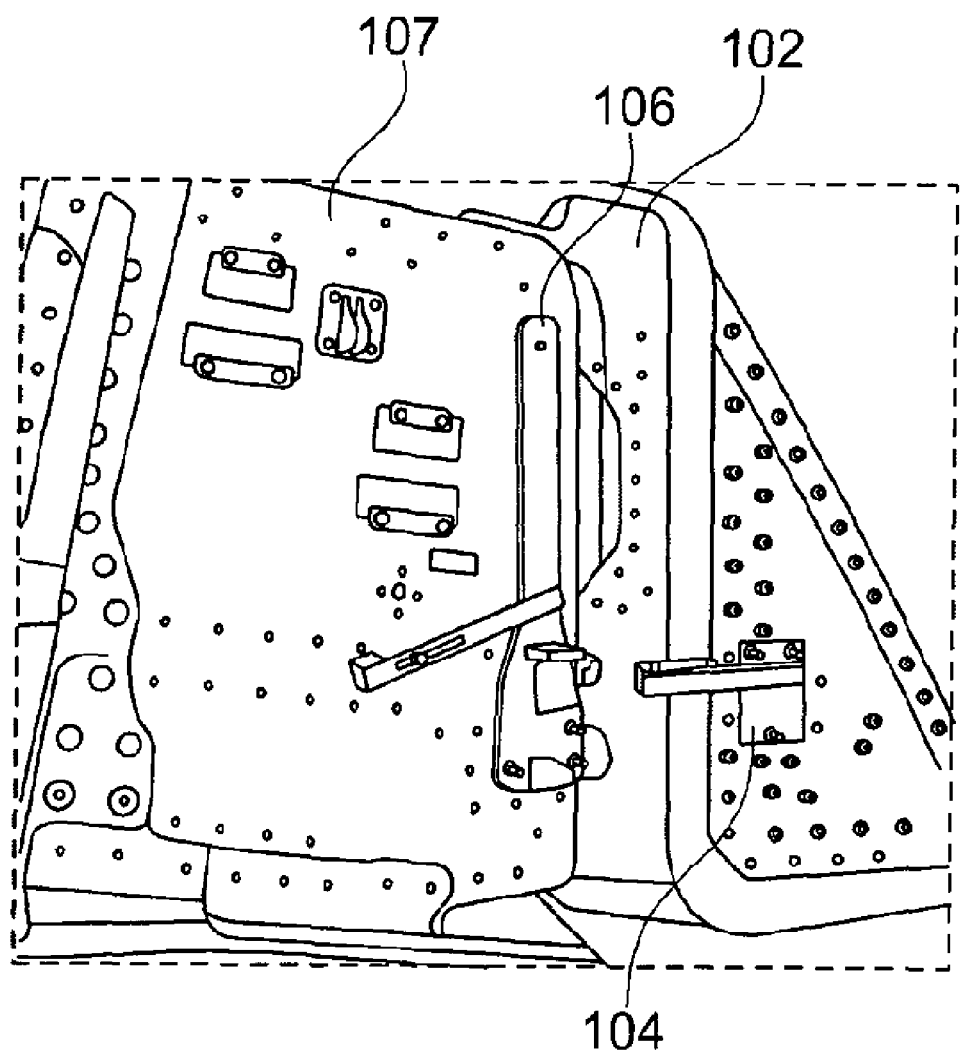
FIG. 11 shows a representation of the mounting section of FIG. 1 and the wing of FIG. 4 in a fifth assembly state according to an exemplary embodiment of the present invention.

FIG. 11 shows a representation of the mounting section of FIG. 1 and the wing of FIG. 4 in a fifth assembly state according to an exemplary embodiment of the present invention. As may be seen from the figure, the wing 107 is moved towards the fuselage section 102 for final mounting of the wing 107. By determining the difference $\Delta z$ between actual z-position of the positioning device 106 and the z-position of the measurement device 104 (which z-position corresponds to the target z-position minus the height of the spacer 302) an adjustment of the wing 107 with respect to the fuselage may be performed on the basis of the difference.

It should be noted that the term 'comprising' does not exclude other elements or steps and the 'a' or 'an' does not exclude a plurality. Also, elements described in association with different embodiments may be combined. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for mounting a wing of an aircraft to a fuselage of the aircraft, the method comprising:
   attaching a first measuring device to the fuselage;
   arranging a first positioning device at a defined position relative to the first measuring device;
   transferring a position mark located at the fuselage at a first target z-position of a first wing mounting point to the first positioning device, resulting in a position mark in the first positioning device;
   attaching the first positioning device to the wing, such that the position of the position mark corresponds to a position of the first wing mounting point;
   moving the wing towards the fuselage;
   determining a first difference between a first actual z-position of the first wing mounting point of the wing and the first target z-position of the first wing mounting point;
   wherein the determination of the first difference is performed on the basis of the first measurement device attached to the fuselage and the first positioning device attached to the wing.

2. The method of claim 1, further comprising:
   determining a second difference between a second actual z-position of a second mounting point of the wing and a second target z-position of the second mounting point, wherein the determination of the second difference is performed on the basis of a second measurement device attached to the fuselage and a second positioning device attached to the wing.

3. The method of claim 1, further comprising:
   adjusting the wing with respect to the fuselage on the basis of at least one of the first difference and a second difference.

4. The method of claim 1, wherein the position mark is a hole.

5. The method of claim 4, wherein arranging of the first positioning device at the defined position relative to the first measuring device is performed with a spacer.

6. The method of claim 1, further comprising:
   adjusting the wing on the basis of a crown fitting.

7. The method of claim 1, further comprising:
   adjusting the wing on the basis of a determination of a contact between a spar and the wing.

8. The method of claim 1, wherein the determination of the first difference is performed with an electronic determination device.

* * * * *